Figure 1:
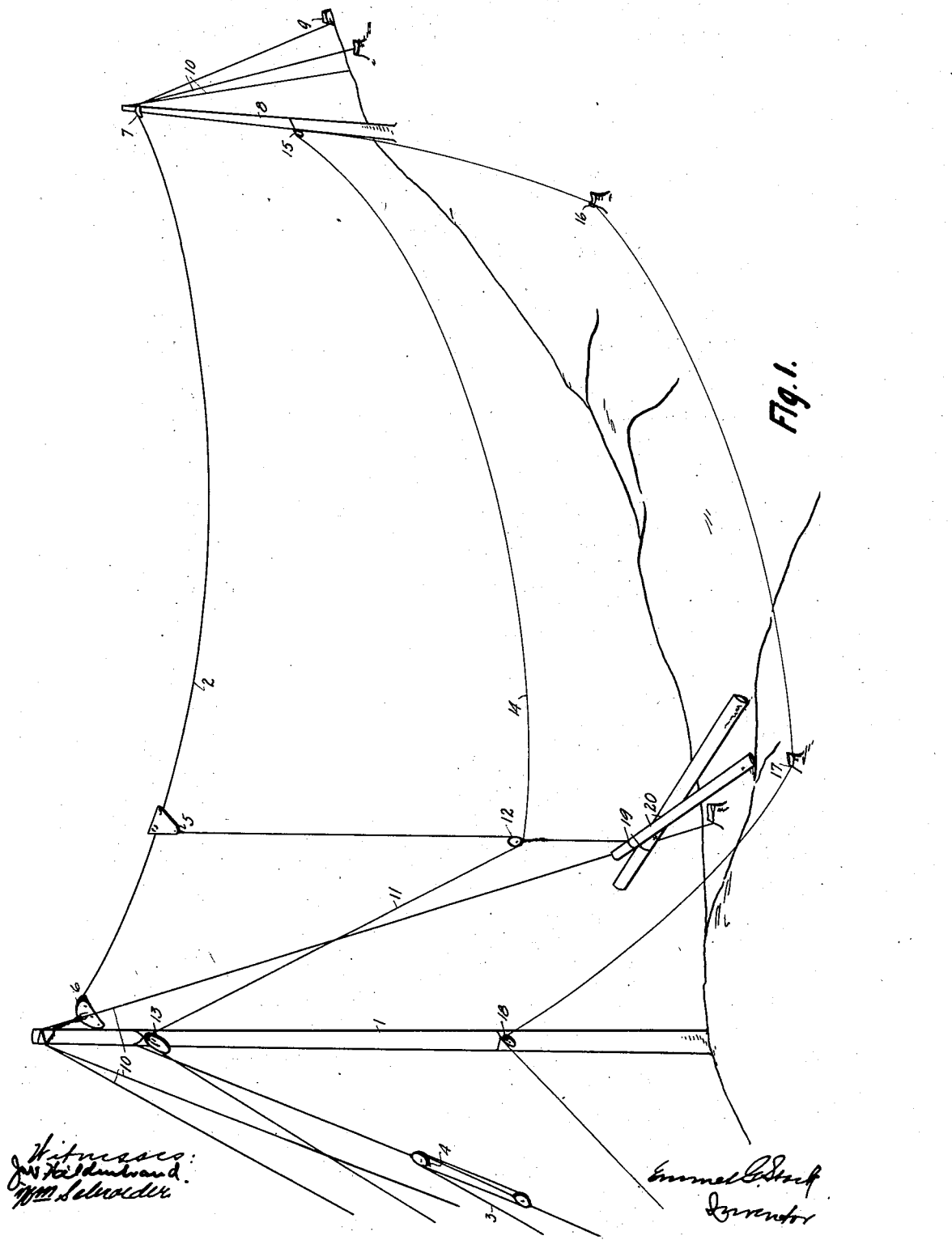

Aug. 24, 1937.  E. G. STACK  2,091,056

LOGGING CARRIAGE STOP

Filed May 18, 1936  4 Sheets-Sheet 2

Aug. 24, 1937.　　　　E. G. STACK　　　　2,091,056
LOGGING CARRIAGE STOP
Filed May 18, 1936　　　　4 Sheets-Sheet 3

Aug. 24, 1937.   E. G. STACK   2,091,056
LOGGING CARRIAGE STOP
Filed May 18, 1936   4 Sheets-Sheet 4

Patented Aug. 24, 1937

2,091,056

UNITED STATES PATENT OFFICE 2,091,056

LOGGING CARRIAGE STOP

Emmet G. Stack, Marshfield, Oreg.

Application May 18, 1936, Serial No. 80,322

10 Claims. (Cl. 188—42)

Along the Pacific Coast the timber is so large and the country so rough that the cost of building adequate roads to get the timber out is prohibitive and hence logging systems employing overhead cableways have been developed. These systems may be roughly separated into slack line systems and tight line systems, each of which has its merits. All have in common: a heavy steel cable, known as a skyline, which is suspended between a head spar-tree at the landing and a tail tree sometimes located over three thousand feet away and sometimes hundreds of feet above or below the spar-tree; a carriage adapted to travel back and forth on the cable; a line to move the carriage toward the spar-tree; a line to move the carriage toward the tail tree; a donkey, or the prime mover for both of said lines or any other lines used with a particular system; and the chokers for hooking logs directly to the carriage or to a block or lines carried by the carriage.

An unloaded skyline would, if its supports were in the same plane, assume the form of a catenary curve, or in other words, it would be said to have a certain percentage of deflection. It follows that the elevation of the carriage would change with its position on the skyline even though the skyline were suspended above level ground. When it is suspended above rough country, the carriage is sometimes hundreds of feet above the ground and the chokers it carries must be lowered in some manner. In the slack line system the skyline is slacked off or lowered so that the carriage is brought to the ground where it is desired to pick up logs. In the tight line systems the skyline remains fixed and a heavy fall block is relied upon to carry the chokers to the ground, or, what is known to the logging fraternity as a slack-pulling line is provided to feed the choker line down to the ground. In order to lower the chokers to the ground at a desired point, the carriage must be at rest, but since it rides upon the inside of a vertically curved track some means must be employed to hold it against the force of gravity. Different arrangements of lines are used for this purpose. Adjacent the spar-tree, hand-operated and carriage-operated latches are sometimes used. Some of these do not always work since the angle that portion of the skyline ahead of the carriage makes with that portion beneath its track sheaves varies with the position of the carriage and/or its load. If none of the above systems is employed, the carriage runs back when its turn of logs is lowered at the spar-tree and the chokers are tightened. In order to unhook the chokers, slack must be pulled. This is hard work and takes time, and time is an important element in expensive logging operations. Many of these special systems require much extra rigging, which also costs money to place, and special donkeys.

What is known as the North Bend system is the simplest and cheapest arrangement yet devised but it incorporates no means to prevent the carriage from running back or for holding it in any desired position between the trees. I have used this system and its carriage in illustrating my invention.

My invention relates to a holding device adapted to hold the carriage at any desired position along the skyline between the spar-tree and the tail tree. It relates to a device which is movable with the carriage itself and which employs a spring clutch adapted to bring into operation the means to stop the carriage whenever its movement in one direction is reversed.

A primary object of my invention is to save time in unhooking the chokers at the spar-tree.

Another object is to eliminate much of the hard work now required to obtain sufficient slack to effect the unhooking operation.

Another object is to hold the carriage without the use of expensive rigging.

A further object is to provide a carriage-holding means whose working position is not fixed.

Thruout the drawings and the specification similar numerals refer to similar parts.

Figure 2:
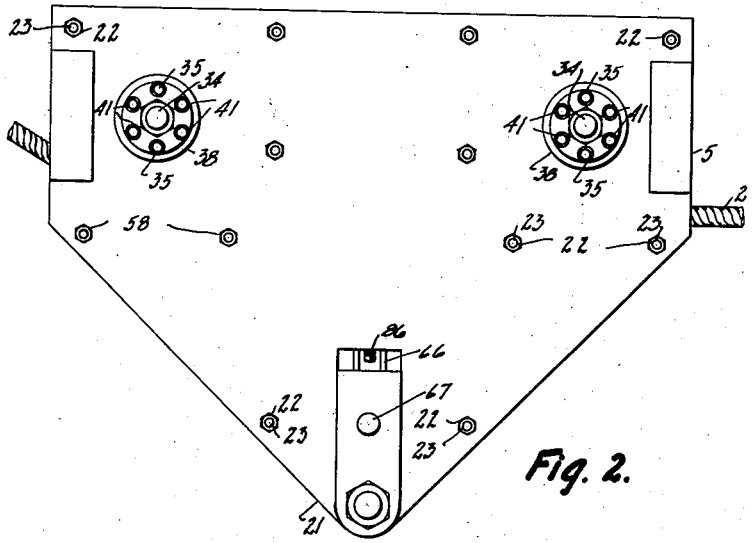
Figure 4:
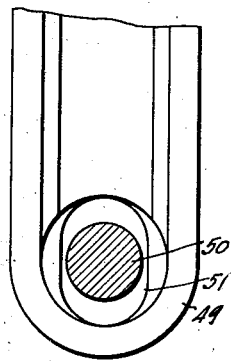
Figure 3:
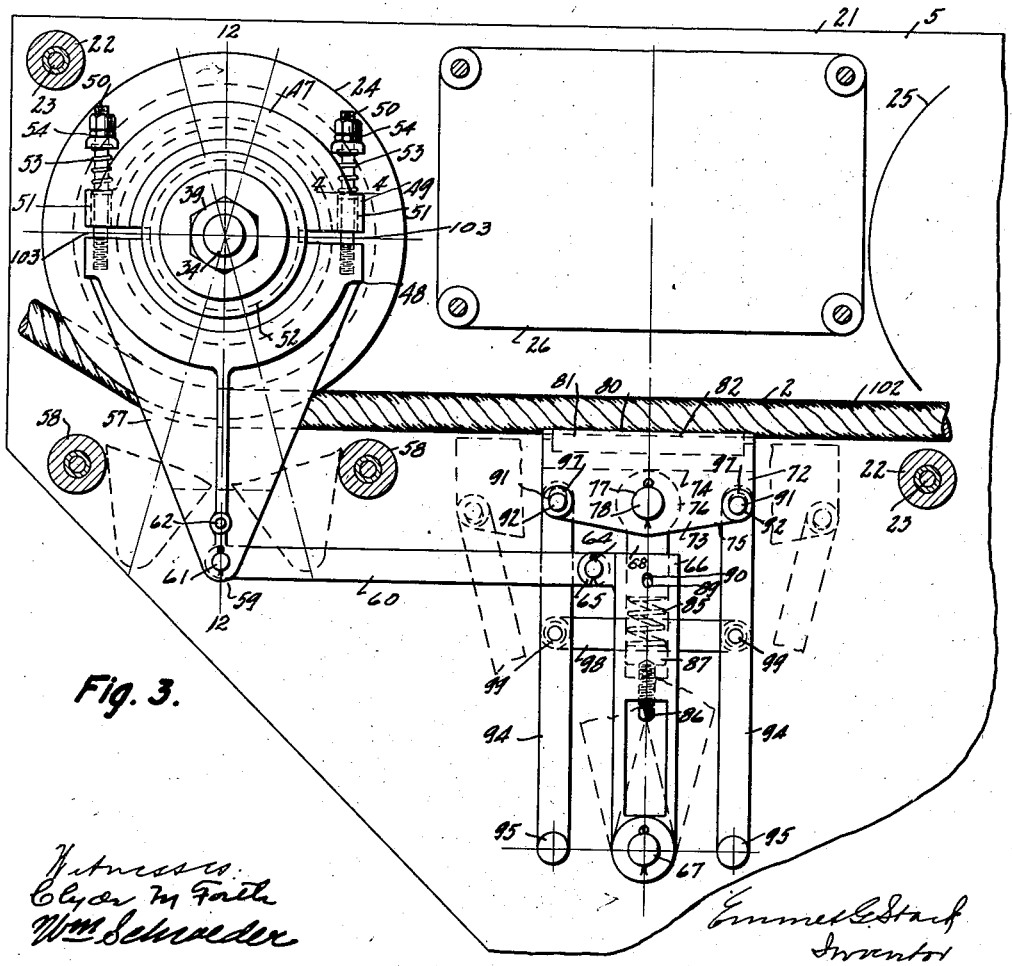
Figure 5:
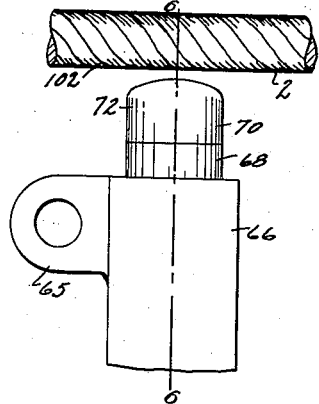
Figure 6:
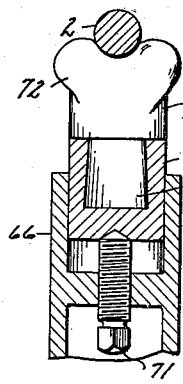
Figure 7:
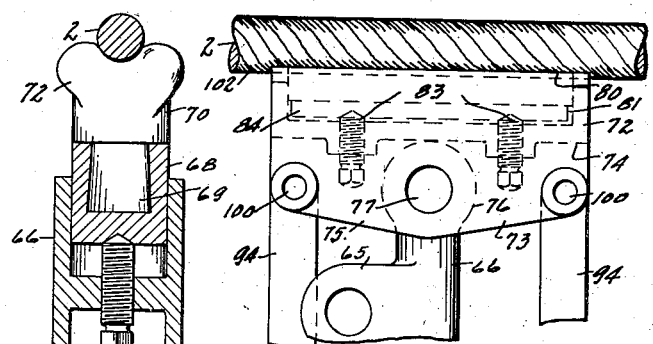
Figure 9:
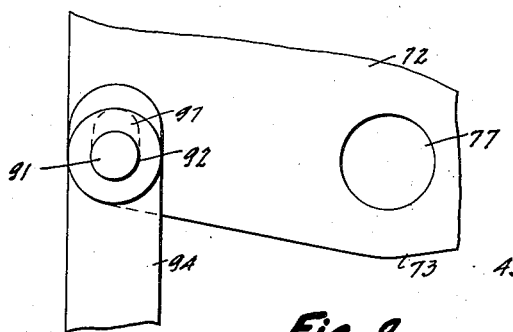
Figure 8:
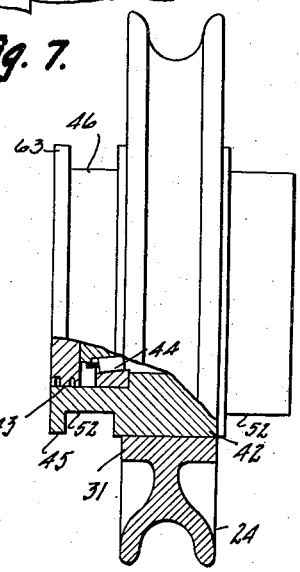
Figure 10:
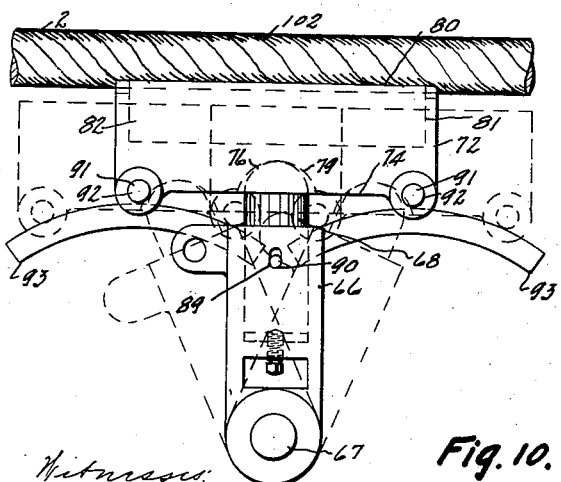
Figure 11:
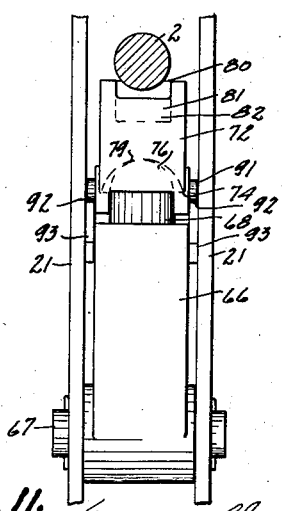
Figure 12:
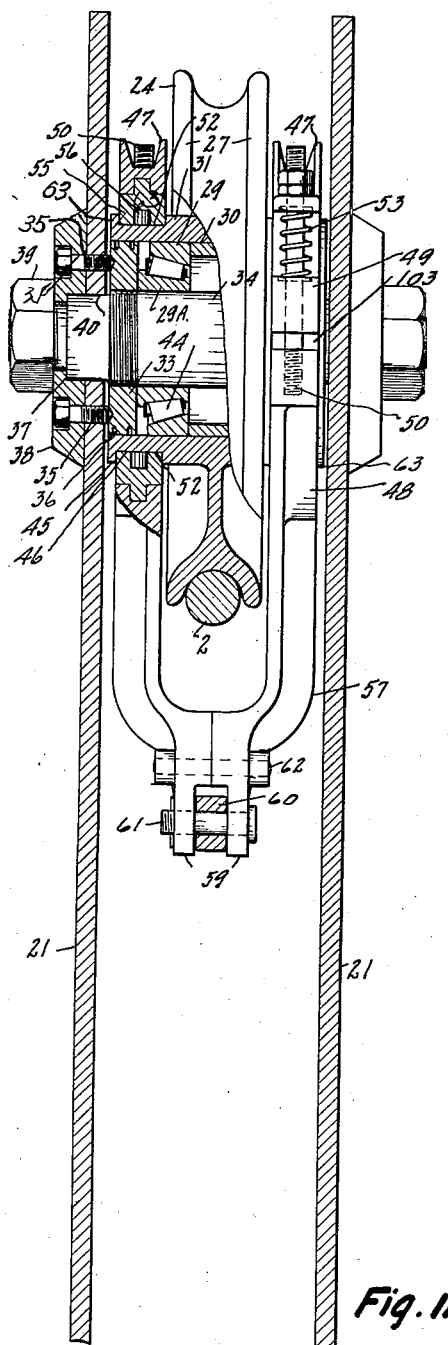
Figure 13:
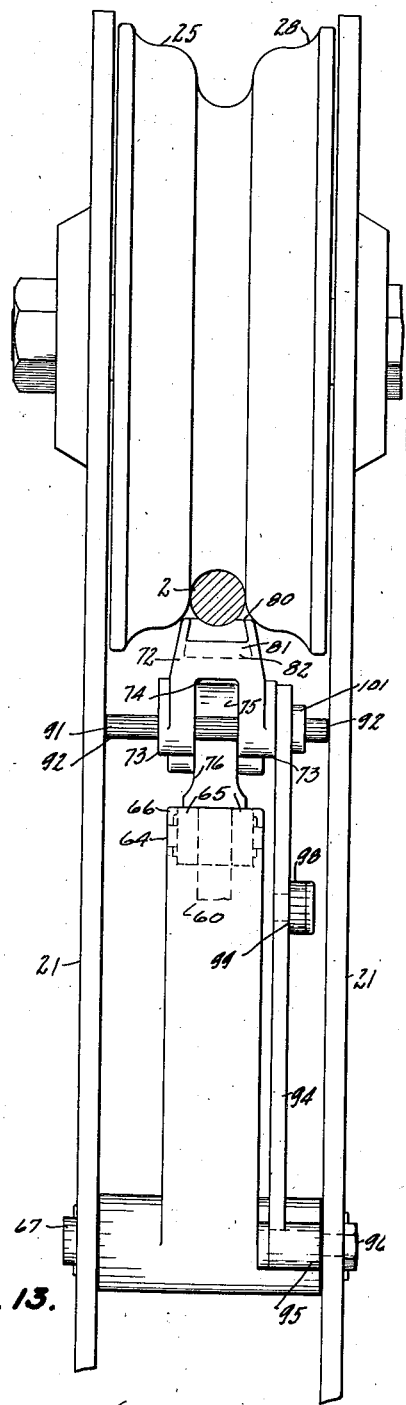

Fig. 1 of the drawings shows the general arrangement of the North Bend system; Fig. 2 is a side view of the carriage; Fig. 3 is a side view of the carriage with the near side plate removed; Fig. 4 is an enlarged section on the line 4—4 of Fig. 3; Fig. 5 is a side view of one form of brake shoe; Fig. 6 is a section on the line 6—6 of Fig. 5; Fig. 7 is a side view of an elongated brake shoe provided with means for the outward adjustment of its cable-contacting means; Fig. 8 is an end view of a track sheave partly in section showing the employment of a bushing for the support of the spring clutch; Fig. 9 is an enlarged side view showing the connection of a parallel link to the brake shoe; Fig. 10 is a side view showing the employment of cam guides for the brake shoe; Fig. 11 is an end view of Fig. 10; Fig. 12 is an end view of the clutch assembly partly in section on the line 12—12 of Fig. 3; Fig. 13 is an end view of the brake shoe provided with parallel links.

Fig. 1 shows the general arrangement of the

North Bend system to which my invention is particularly adapted but not confined. The donkey, or prime mover, not shown, is positioned adjacent the spar-tree 1. To a drum on the donkey the skyline 2 is indirectly secured by the fall line 3 of the tightening blocks 4. The skyline 2 over which the carriage 5 travels, is shown extending from the tree shoe 6 on the spar-tree 1 to the tree shoe 7 on the tail tree 8 and thence to the stump 9 to which it is anchored. The guy lines 10 are used to provide support for the spar and tail trees. To the bottom of the carriage 5 is attached the haul-in line hereinafter termed the main line 11 which passes thru the fall block 12 and up and over the high lead block 13 on the spar-tree 1 and down to its donkey drum (not shown). The haul-back line hereinafter termed the trip line 14 is attached to the fall block 12 and is guided by the trip blocks 15, 16, and 17, to the head trip block 18 on the spar-tree 1 from which it extends down to its donkey drum (not shown). The chokers 19 are attached to the fall block 12 and to the logs 20 which are to be delivered adjacent the spar-tree 1.

The sides of carriages are sometimes cast but they are more often cut from steel plate to the shape most suitable for use with the system employed. The triangular shape shown in Fig. 1 is particularly adapted to the North Bend system. The sides 21 are similar and are spaced apart the desired distance by a number of the spreaders 22 thru each of which a bolt 23 is passed by means of which the carriage may be easily assembled or disassembled.

Between the two sides 21 are mounted two track sheaves 24 and 25 which are adapted to travel on the skyline 2. These sheaves are spaced apart to permit the positioning of a skyline oiling device 26 between them. The sheave 24 is formed with straight narrow flanges 27 as shown in Fig. 12, while the flanges of the sheave 25 have outstanding portions 28, as shown in Fig. 13, which extend to the carriage sides 21.

Most manufacturers employ fixed pins but mount their track sheaves upon them in various ways, some using plain bushings and others ball or roller bearings. Fig. 12 shows a roller bearing mounting. In Fig. 12, the bearing cups 29 are mounted directly in the bore 30 of the sheave hub 31 and are separated by the annular spacing ring 32. The cones 29A are adjusted and held by the nuts 33 threaded on the sheave pin 34. When once adjusted the nuts are held by the screws 35 threaded into the carriage sides 21. The nuts 33 are shown provided with the grease grooves 36 for retaining the bearing lubricating grease. The sheave pin 34 is formed with a shoulder 37 on each end which is clamped against the bearing plate 38 by the nuts 39. Bearing support for the sheave pin 34 is provided by the bore 40 formed in each side plate 21. The bearing plate 38 is secured to the side plate 21 by the screws 41.

In Fig. 8, the sheave hub 31 is provided with a bushing 42 in the bore 43 of which is mounted the bearings 44. The use of the bushing 42 might be desirable where manganese steel is used for track sheaves. On the exterior surface 45 of either the bushing 42 or the sheave hub 31 is formed the annular groove 46 for fixing the position of the spring clutch 47. Ordinarily either two narrow or two wide sheaves are used on a carriage and I may use two alike and of either type, but I prefer to use one narrow sheave 24 and one wide sheave 25. I can mount a spring clutch 47 on one or both sides of one sheave or on one or both sides of both sheaves. I have shown a spring clutch 47 mounted on each side of the narrow sheave 24 in Fig. 12. The gripping portion of the spring clutch 47 includes the body member 48 and a cap member 49 attached to it by the stud bolts 50 which pass thru the slotted holes 51 in the cap 49. These slotted holes 51 are clearly shown in Fig. 4. The grip on the bearing portion 52, in this instance that of the groove 46, by the spring clutch 47 is regulated by the coil spring 53 inserted between the cap 49 and the nuts 54 on each stud bolt 50. I have shown the gripping portions of the spring clutch 47 provided with a liner 55 in which is positioned the cork inserts 56. This arrangement provides a good wearing surface, if for instance the bearing portions 52 are made of steel and the liner 55 is made of brass, which may be readily renewed, and it also provides a good gripping surface which may be kept oiled without losing too large a percentage of its coefficient of friction. Under ordinary circumstances the spring clutch 47 would grip the bearing portion 52 and turn with the track sheave 24, but in this instance its travel is limited by its arm 57, which is an extension of the body member 48, coming into contact with either of the stop pins 58 carried by the sides 21. Whenever either of the stop pins 58 is contacted by the arm 57, the gripping portions of the spring clutch 47 slip on the bearing portion 52. I have shown the use of two spring clutches 47, one on each side of the track sheave 24, with their arms 57 joined together beneath the skyline 2 and formed to provide the jaws 59 for the reception of one end of the connecting link 60 which is hingedly connected to said jaws by the hinge pin 61 which also serves to tie the arms 57 together so that they may act as a unit. I have also used a dowel 62 to maintain the relative position of the arms 57 in the unit independently of the hinge pin 61. It is evident that the two arms 57 might be formed as a unit but I believe that it is best to detachably secure them together so that they may be separated to permit the skyline 2 to be laid in place rather than thread it thru. The flange 63 shown in Fig. 8 may be eliminated, as I have shown it eliminated on one side, when the double clutch arrangement is used. It is to be seen that a clutch 47 may be slipped sideways off the bearing portion 52 without disturbing the adjustment of its springs 53.

The opposite end of the connecting link 60 is connected by the hinge pin 64 to the jaws 65 formed on the upper end of the rocker arm 66 whose hinge pin 67 is carried by the sides 21.

In Fig. 6, the upper end of the rocker arm 66 is bored for the reception of a cylindical holder 68 which in turn is taper bored to receive the lower end 69 of a cylindrical plug 70 made of resilient material adapted to conform to the configuration of the skyline 2 when put under pressure so as to act as a brake shoe on said skyline. As a means for taking up wear and increasing the overall length of the arm 66, I have made the holder 68 a snug fit in the arm 66 and provided the screw 71 for its outward adjustment.

Where conditions require more gripping surface on the skyline 2 than is afforded by the type of shoe 72 shown in Figs. 5 and 6, an elongated shoe 72 of the type shown in Figs. 3, 7, 9, and 10, may be employed. In Figs. 3 and 7, the flanges 73 depending from the bottom face 74 of the shoe 72 are spaced apart to form the jaws 75 adapted to receive the lug 76 formed on the end of the arm 66 as shown in Fig. 7, and on the end of the holder 68 carried by said arm, as shown in Fig. 3. The jaws 75 and the lug 76 are provided with a bore 77 for the reception of a pin 78 by means of which said shoe 72 is hingedly connected directly or indirectly to the arm 66. In Figs. 10 and 11, this hinged connection is effected by providing a hemispherical seat 79 in the bottom face 74 of the shoe 72 and shaping the lug 76 on the arm 66 or the holder 68, the holder only being shown, hemispherically to pivot in the seat 79.

The top face 80 of the shoe 72 is shaped to form the pocket 81 for the reception of the material 82 contacting the skyline 2. This material 82 may be of a resilient nature such as a suitable rubber composition which may be indented with the configuration of the skyline 2, or, it may be of a soft non-cutting metal such as babbitt or of other composition which, like the metal, may be preformed to said configuration. In Fig. 7, the material 82 is adjusted outwardly to take up wear or to increase the overall length of the arm 66 by means of the screws 83 threaded into the bottom face 74 of the shoe 72 and against the plate 84 upon which said material 82 is supported. In Fig. 3, the overall length of the arm 66 may be increased or decreased thru the action of the coil spring 85 acting against the holder 68. The tension in the spring 85 is adjusted by the screw 86 acting against the washer 87 directly supporting said spring 85. The holder 68 is slidable in the bore 88 of the arm 66 and is limited in movement by the stop pin 89 which projects from said holder and into a slot 90 formed to a predetermined length in the arm 66.

It is desirable that the shoe 72 shall be out of contact with the skyline 2 during the time the carriage 5 is being moved by the donkey in either direction. It is also desirable that the elongated type shoe 72 be maintained in parallel relation to the skyline 2 while being moved into and out of contact therewith. In Figs. 10 and 11, a pin 91 is carried in each end of the shoe 72 and projects therefrom on each side to form the supports 92. These supports 92 ride upon the cams 93 welded, for instance, to the sides 21. The cams 93 are given the approximate radius of the arm 66. Where the cams 93 are used to maintain the parallel relation of the shoe 72, the material 82 should be of a resilient nature in order to provide for the necessary change in the length of the arm 66 as it is moved into and out of contact, thru the shoe 72, with the skyline 2. The arrangement shown in Fig. 7, may also be used where the cams 93 are employed. In Figs. 3 and 13, the shoe 72 is, in reality resiliently mounted, and hence when the arm 66 is shortened under pressure, the shoe 72 moves downwardly. To permit this downward movement I have used a link 94 to support each end of the shoe 72. The lower end of each link 94 is hinged upon a shouldered pin 95 secured to a side 21 by a clamping nut 96 and the upper end is provided with a slot 97 which serves as a guide for a cylindrical support 92 which projects into it—see Fig. 9. In order to hold the shoe 72 parallel to the skyline 2 when the slots 97 are employed, the links 94 are tied together intermediate their ends by a link 98 hingedly connected to them by the shouldered pins 99, whereby the links 94 must move as a unit. The center of the rocker arm hinge pin 67 and the centers of the link hinge pins 95 are equally spaced from the skyline 2, and since the links 94 and the arm 66 swing on the same radii and are parallel to one another, and since the arm 66 is hingedly connected to the shoe 72 and its hinge pin 78 is adapted to be moved radially, and since the two links 94 must move as a unit, it follows that the shoe 72 is limited to parallel radial movement relative to the arm 66 and the links 94 and must maintain its parallel relation to the skyline 2 as it is moved into and out of contact therewith. Where parallel links 94 are employed with the arrangement shown in Fig. 7, the upper end of the links may be hinged directly upon a support 92 carried in the holes 100 provided for said supports in the shoe 72. In Fig. 13, the collar 101 is provided to back up the link 94 on the support 92. As further shown in this figure, the supports 92 are extended to the sides 21 so that the shoe 72 is prevented from twisting as it is brought into contact with the spirally twisted strands 102 of the skyline 2.

When the carriage 5 is moved in one direction thru the agency of the donkey (not shown), the tendency of the spring clutch 47 is to grip its bearing portion 52 and turn with the sheave 24 until the clutch arm 57 comes into contact with the stop pin 58 in the path of its movement. When the arm 57 contacts this stop pin 58, the spring clutch 47 slips on its bearing portion 52 during further movement of the carriage 5 in that direction. When this occurs, the rocker arm 66 and its shoe 72 are in one of the positions indicated by their dotted outlines shown in Fig. 3, and the shoe 72 is out of contact with the skyline 2. When the movement of the carriage 5 in one direction is reversed, as when the carriage starts to run back when a turn of logs is dropped at the spar-tree, the spring clutch 47 again grips its bearing portion 52 and the shoe 72 is raised into and held in contact with the skyline 2. When the shoe 72 is moving into this contact from one direction, the bottom of the rocker arm 66 is being moved in the opposite direction due to the movement of the carriage 5. In other words, the arm 66 may be considered a moving strut whose movement is effected by the moving carriage 5 and resisted by the skyline 2. Such an arrangement only requires a spring clutch strong enough to raise the shoe 72 into contact with the skyline 2. When the resistance is sufficient to arrest the wedging action set up between the skyline 2 and the hinge pin 67 by the moving carriage 5 acting on the arm 66, the carriage 5 stops. To move it again, the agency of the donkey (not shown), acting thru the main line 11 or the trip line 12, is required. In releasing the pressure on the shoe 72, the shoe 72 fulcrums or pivots on the skyline 2 as the bottom of the arm 66 moves with the carriage out from under it. Since the top of the arm 66 does not move at once it holds the bottom of the clutch arm 57 by means of the connecting link 60 and the clutch 47 fulcrums or pivots on the hinge pin 61 and slips on the bearing portion 52 as the sheave 24 moves forward with the carriage 5. When the bottom of the arm 66 is moved forward sufficiently to relieve the pressure on the shoe 72 the clutch 47 again functions to move the shoe 72 away from the skyline 2. It is of course quite evident that in order to meet the conditions encountered, the force supplied by the moving carriage 5 alone must be less than the resistance set up. I have shown interposed resilient means between the skyline 2 and the hinge pin 67 and have also shown means for its adjustment. This, in other words, is also the equivalent of making the arm 66 adjustable to length or to adjusting the hinge pin 67 with relation to the skyline 2. It is desirable that the construction be such that the carriage 5 comes to a stop before the maximum gripping pressure is exerted on the skyline 2, in other words the carriage 5 should be stopped before the arm 66 is in its central position, but it follows that the nearer the force and resistance come to being equalized the more readily the carriage 5 is moved from its stop position by the donkey. In order that the spring clutch 47 may function efficiently in accordance with its gripping surface, its springs 53 must be adequate and the slotted holes 51 and the space 103 between the cap 49 and the body member 48 be of sufficient size so as to permit the free movement of the gripping members into action.

It will be noted that many changes may be made in the design and arrangement of parts without departing from the basic idea of my invention and I therefore do not limit myself to the exact disclosures but extend my invention to all that comes fairly within the scope of the appended claims.

What I claim as new, is:

1. In a stop for a logging carriage having sheaves on which to move over a cable in combination, a brake shoe to contact the cable, and means for effecting said contact including a spring clutch operated thru movement of a carriage sheave.

2. In a stop for a logging carriage having sheaves on which to move over a cable, in combination, a brake shoe to contact the cable; means for effecting said contact including a spring clutch operated thru movement of a carriage sheave; and means to hold the brake shoe in parallel alignment with the cable while being moved into and out of contact therewith.

3. In a stop for a logging carriage having sheaves on which to move over a cable, in combination, a brake shoe having a resilient portion to contact the cable, and means for effecting said contact including a spring clutch operated thru movement of a carriage sheave.

4. In a stop for a logging carriage having sheaves on which to move over a cable, in combination, a brake shoe having a resilient portion to contact the cable; means for the outward adjustment of the resilient portion; and means for effecting the contact of the brake shoe including a spring clutch operated thru movement of a carriage sheave.

5. In a stop for a logging carriage having sheaves on which to move over a cable, in combination, a brake shoe to contact the cable; an arm for bringing the brake shoe into contact adapted to be shortened under pressure; and a spring clutch operated by movement of a carriage sheave to effect movement of the arm.

6. In a stop for a logging carriage having sheaves on which to move over a cable, in combination, a brake shoe to contact the cable, and means for effecting said contact including a spring clutch operably mounted on a track sheave.

7. In a stop for a logging carriage having sheaves on which to move over a cable, in combination, a brake shoe member to contact the cable; an arm member for bringing the brake shoe into contact; a spring clutch operated by movement of a carriage sheave to effect movement of the arm member; and an element arranged to yield under a predetermined pressure carried by one of said members and adapted to be operable by the other.

8. In a stop for a logging carriage having sheaves on which to move over a cable, in combination, a brake shoe to contact the cable; a spring clutch operated by movement of a carriage sheave; means spaced apart and arranged to limit the movement of the spring clutch; and means operatively connecting the spring clutch with the brake shoe whereby the brake shoe is out of contact with the cable when either of the limiting means are engaged.

9. In a stop for a logging carriage having sheaves on which to move over a cable, in combination, a resiliently mounted brake shoe to contact the cable, and means for effecting said contact including a spring clutch operated thru movement of a carriage sheave.

10. In a stop for a logging carriage having sheaves on which to move over a cable and provided with side plates for the support of said sheaves, in combination, a brake shoe member to contact the cable, and means for effecting the contact of the brake shoe which includes an arm for bringing the brake shoe into contact, a support for the arm carried by the side plates, resilient means interposed between said support and the cable contacting portion of the brake shoe, and a spring clutch operated thru movement of a carriage sheave to effect movement of the arm.

EMMET G. STACK.